(No Model.)
L. GUTMANN.
ELECTRIC MOTOR AND MOTOR GENERATOR.
No. 559,380. Patented May 5, 1896.
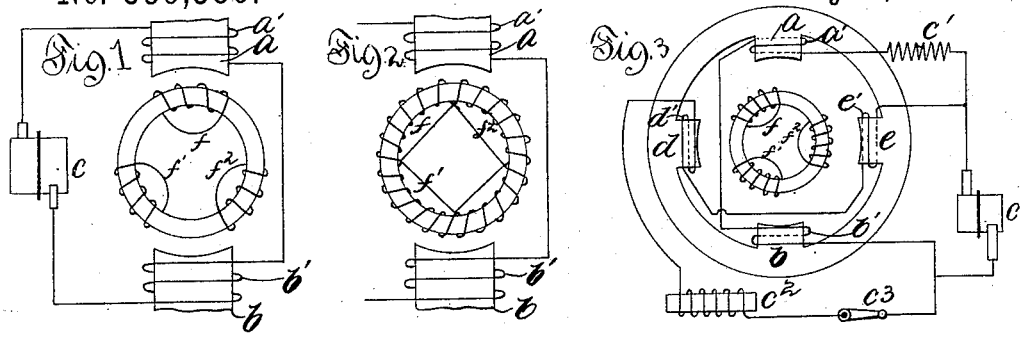
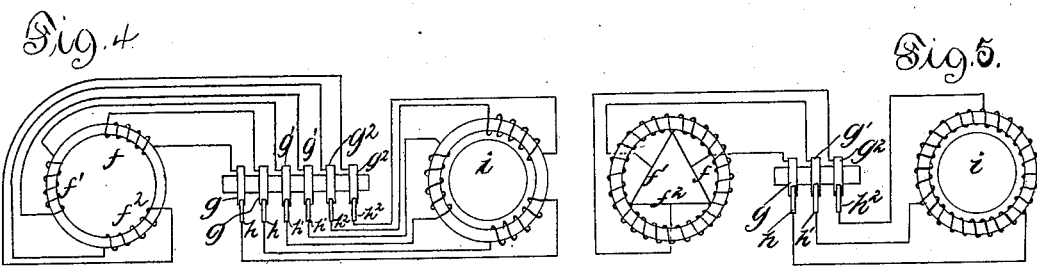
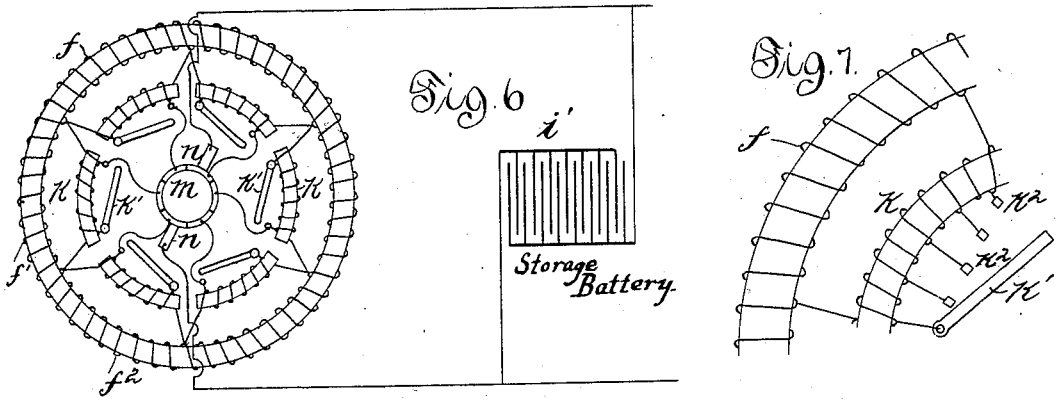
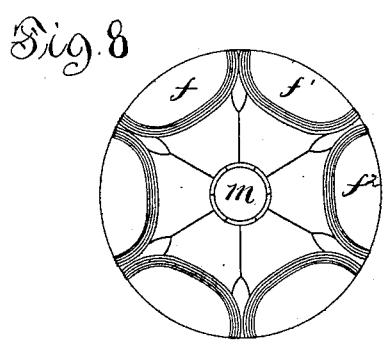
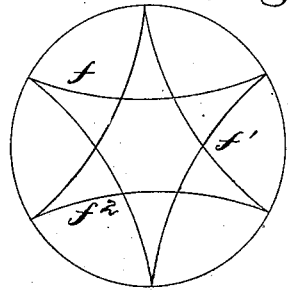
Witnesses:
George L. Cragg.
George S. Buell.
Inventor:
Ludwig Gutmann.
By Bartow Brown
Attorneys.

UNITED STATES PATENT OFFICE.

LUDWIG GUTMANN, OF CHICAGO, ILLINOIS.

ELECTRIC MOTOR AND MOTOR-GENERATOR.

SPECIFICATION forming part of Letters Patent No. 559,380, dated May 5, 1896.

Application filed July 10, 1894. Serial No. 517,096. (No model.)

*To all whom it may concern:*

Be it known that I, LUDWIG GUTMANN, a subject of the Emperor of Germany, residing at Chicago, in the county of Cook and State of Illinois, have invented a certain new and useful Improvement in Electric Motors and Motor-Generators, (Case No. 65,) of which the following is a full, clear, concise, and exact description, reference being had to the accompanying drawings, forming a part of this specification.

My invention relates to an electric motor and motor-generator; and its object is the provision of a self-starting synchronous motor, and, furthermore, a motor-generator adapted to be supplied with a uniphase alternating current and to supply current to translating devices in a working circuit.

In Letters Patent No. 530,176, granted to me December 4, 1894, I have described a non-self-starting synchronous motor, in which the armature is provided with a winding containing subcircuits; and the object of the present invention is to provide means for starting said motor, and, further, to adapt the same for a motor-generator to supply current to a working circuit.

I will describe my invention in connection with the accompanying drawings, in which—

Figure 1 illustrates a non-self-starting motor of the above-mentioned type, the armature being provided with independent coils. Fig. 2 is a similar view of a motor provided with an interconnected winding. Fig. 3 illustrates a motor provided with self-starting means. Fig. 4 illustrates, diagrammatically, the motor employed as a motor-generator. Fig. 5 illustrates a motor-generator provided with an interconnected winding. Fig. 6 shows means for cutting down the flow of current through the supplemental circuits in starting. Fig. 7 shows a modification thereof. Fig. 8 is a view of a drum-armature wound to develop distinct poles in order that the same may remain in step when running. Fig. 9 shows a modified form of winding.

Like letters refer to like parts in the several figures.

If the armature of Figs. 1 and 2 be brought up to speed, the same will continue to rotate synchronously, due to the production in the supplemental circuits of currents lagging in phase. In order to start the armature, Fig. 3, I provide four poles, two poles $a$ $b$ being excited by coils $a'$ $b'$, connected through resistance $c'$ in circuit with a generator of alternating currents $c$, the two remaining poles $d$ $e$ being excited by coils $d'$ $e'$, connected in circuit with the generator and an inductive device $c^2$. The field produced by the coils $d'$ $e'$ thus lags in phase, and the two magnetic field systems produced cause the armature to start from rest. When the critical speed has been attained, the coils $d'$ and $e'$ may be cut out by means of a switch $c^3$, and the armature will continue to run synchronously under the influence of poles $a$ and $b$.

I have discovered that currents of any desired number of phases may be produced by first obtaining a rotation which is harmonic with the alternations of the current or the energy to be transformed. After having obtained this synchronous or harmonic speed any fixed number of polyphased currents may be obtained by constructing the winding in such a manner that the coils are passing successively through a given magnetic field when at different strength, or, what means the same, that the winding is so distributed round the rotatable core that not all the coils occupy equal positions with respect to the magnetic field, as has been the practice heretofore with synchronous devices.

Fig. 3 also shows how two phase currents may in a similar manner be split into any other desired number of polyphased currents.

The number of phases of the transformed current will depend upon the number of coils provided upon the armature, while the frequency of the transformed current will depend upon the number of coils passing the field-poles or positions of maximum magnetic flux during one complete alternation of the original current. If the number of coils on the armature be different from the number of phases of the original current, and more or less than one of said coils pass the field-poles during one complete alternation of the original current, both the number of phases and the frequency will be altered.

The motor may be employed as a motor-generator, collecting devices being provided for taking off the currents in the supplemental circuits. As shown in Fig. 4, the terminals of the coils $f\ f'\ f^2$ are connected with collecting-rings $g\ g\ g'\ g'$, &c., brushes $h\ h\ h'\ h'$, bearing upon the rings, being adapted to collect the displaced currents. A polyphase motor $i$ is shown connected in circuit with the brushes.

In Fig. 5 is illustrated an armature provided with an interconnected winding, but three collecting-rings being employed for conveying to the translating device $i$ the displaced currents. If but two of the collecting-rings be employed, a single-phase current may be collected.

Fig. 6 illustrates a modified armature and external circuit, the field-magnets being omitted. In starting a motor the counter electromotive force is below normal until the speed has risen to or above the critical value, and consequently currents of large volume will flow through the armature-windings, which tends to demagnetize the field-magnets. In order to cut down the currents at this stage, I provide in the supplemental circuits an inductive resistance $k$ and a short-circuiting switch $k'$. Until the armature attains the critical speed the switch $k'$ is kept open, the inductive resistance serving to cut down the current. When speed has been attained, the switches $k'$ may be closed manually or automatically by the provision of governor-balls or the like, the effect of the inductive resistance being thus removed. The armature contains six subcircuits and is provided with a six-part commutator $m$. The brushes $n$, resting on commutator $m$, are connected to an external circuit and supply the storage battery $i'$ with continuous currents, obtained by commutating three-phased alternating currents.

In Fig. 7 is illustrated a modification in which a number of terminals $k^2$ are provided, so that the amount of the inductive resistance may be adjusted or cut out gradually.

It is of vital importance for the production of pluraphased as well as continuous currents that harmonious rotation should be maintained, as the falling out of step would naturally also modify the flow of currents in an external circuit. To maintain the rotary core in stability with the inducing-field, I have discovered that it is essential that the armature should be so constructed as to possess different magnetic resistances at different parts of the core, or, to be more specific, a ring or cylindrical core should be provided with a comparatively small number of coils, Fig. 8, so as to develop strong well-defined poles, or the core itself should be of the toothed type.

Fig. 9 shows in diagram a modified winding over Fig. 8, in which the coils, instead of lying side by side, overlap each other.

Having thus described my invention, what I claim as new, and desire to secure by Letters Patent, is—

1. The combination with a source of single-phase currents, of a motor provided with field-magnet coils adapted to be traversed by currents of the same phase, an armature provided with coils, the number of which is different from the number of field-poles or positions of maximum magnetic flux, and an additional field-coil or set of coils adapted to be traversed at starting by a current of displaced phase, substantially a described.

2. The combination with a source of single-phase alternating currents, of a motor provided with field-coils adapted to be traversed by currents of the same phase, and an armature provided with a number of independent coils, the number being different from the number of field-poles or positions of maximum magnetic flux, whereby the motor may run harmoniously at more than one speed, substantially as described.

3. The combination in the armature of an alternating-current machine, of the main winding, the subcircuits of variable resistance associated therewith, and means for regulating the resistance of said subcircuits; substantially as described.

In witness whereof I hereunto subscribe my name this 7th day of July, A. D. 1894.

LUDWIG GUTMANN.

Witnesses:
GEORGE L. CRAGG,
GEORGE P. BARTON.